United States Patent [19]

Bond

[11] Patent Number: 5,013,210

[45] Date of Patent: May 7, 1991

[54] WORKPIECE TRANSFER APPARATUS WITH FOLDING ARMS

[76] Inventor: Irvin D. Bond, 1027 Allen Rd., Clarkston, Mich. 48016

[21] Appl. No.: 348,554

[22] Filed: May 8, 1989

[51] Int. Cl.$^5$ ............................................. B25J 18/04
[52] U.S. Cl. ................................. 414/744.6; 414/749; 414/752; 414/225; 901/15
[58] Field of Search .................. 414/744.1, 744.6, 752, 414/749, 225; 901/15, 40; 74/89.15, 89.22, 89.2

[56] References Cited

U.S. PATENT DOCUMENTS

| | | | |
|---|---|---|---|
| 3,010,587 | 11/1961 | Hollinger | 901/15 X |
| 4,712,971 | 12/1987 | Fyler | 901/15 X |
| 4,730,976 | 3/1988 | Davis et al. | 414/744.6 X |
| 4,836,733 | 6/1989 | Hertel et al. | 414/225 |

Primary Examiner—David A. Bucci
Assistant Examiner—Donald W. Underwood
Attorney, Agent, or Firm—Charles W. Chandler

[57] ABSTRACT

A workpiece transfer (conveyor) mechanism wherein two powered foldable arm structures are supported on a transfer carriage to extend the reach of the transfer mechanism. Each arm structure comprises two pivotably connected arms, each of which is powered to move at a different angular rate. The arm structures are operable to shift the workpiece along the carriage while the carriage is moving between the loading point and the unloading point.

5 Claims, 4 Drawing Sheets

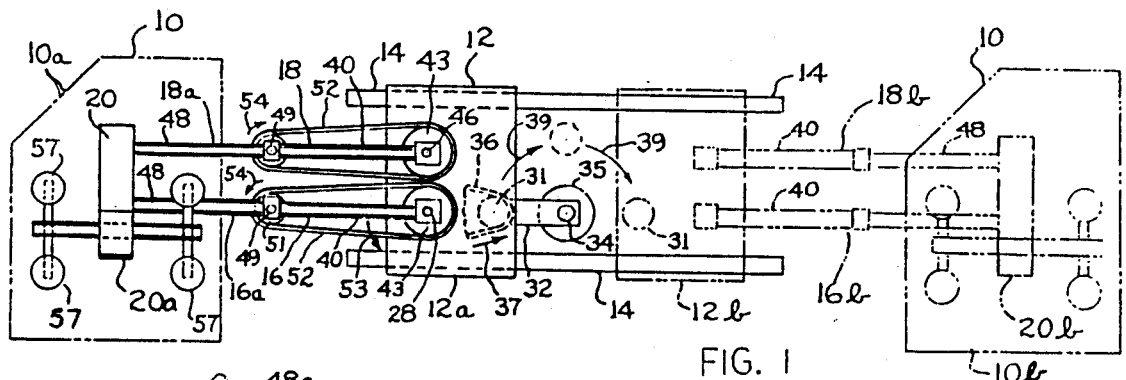
FIG. 1
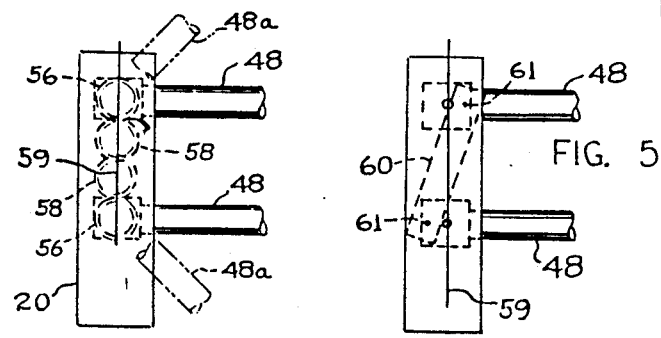
FIG. 4
FIG. 5
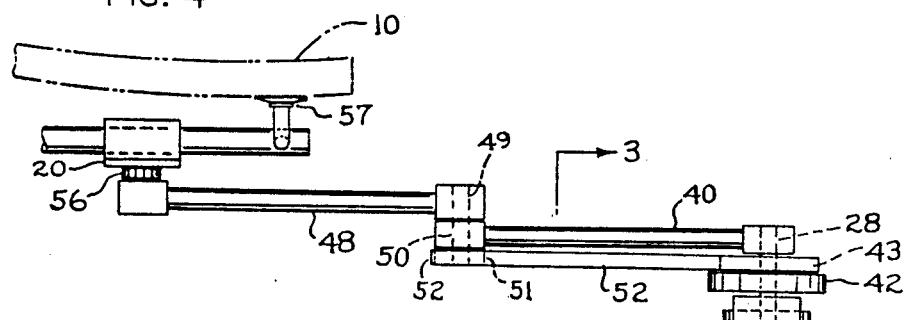
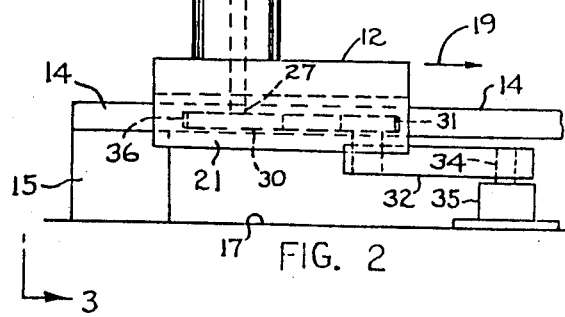
FIG. 3
FIG. 2

WORKPIECE TRANSFER APPARATUS WITH FOLDING ARMS

BACKGROUND OF THE INVENTION

This invention relates to a work transfer mechanism usable in an automobile plant for transporting a panel, such as a door panel or the like, between fixtures. The mechanism, in its preferred form, comprises a carriage movable linearly along stationary guides extending between two transfer points. Two foldable arm structures are supported on the carriage for folding-unfolding movements separate from the carriage movement. A work-gripper platform is carried on the free ends of the foldable arm structures. The work-gripper platform includes vacuum cup devices engageable with the work to be transferred. Other types of work grippers can be used, e.g. magnets or jaw structures.

The foldable arm structures can extend into confined spaces within forming dies or support fixtures to enable the vacuum cup devices to grip and remove the work from the confined space. Carriage motion will usually be used to advance the arm structures into the confined space and then retract the arm structures out of the confined space.

During the carriage motion toward the discharge point, the foldable arm structures undergo a reverse folding-unfolding motion so that the supported work is transferred from one end of the carriage to the other end of the carriage. When the carriage arrives at the discharge point, the arm structures support the work at the other end of the carriage. Final motion of the carriage can be used to insert the work into a work station or other transfer point.

The transfer mechanism of this invention is designed to move the work between two confined spaces located relatively far apart, e.g. 20 feet.

The foldable arm structures have minimum overhang along the side edges of the carriage, such that the transfer mechanism requires a relatively narrow floor space.

The foldable arm structures are also advantageous in decelerating the work platform as it nears the end limits of its stroke, i.e. as it begins to pick up the workpiece or unload the workpiece. During the end stages of the work platform motion, the arm structures complete their unfolding motions in a relatively slow controlled fashion. During the major portion of the stroke, the work platform moves at a relatively high rate.

The transfer mechanism utilizes a combination of movements i.e. the carriage movement and the arm structure movement. The movements take place simultaneously, such that a relatively long total stroke distance can be achieved in a relatively short period of time, thereby resulting in relatively high cycle rates. Such high cycle rates are also due to the fact that the arm structures are relatively light low-mass structures that can be accelerated to high speeds with relatively modest size power mechanisms (motors).

DESCRIPTION OF THE DRAWINGS

FIG. 1 is a top plan view of an apparatus embodying the invention.

FIG. 2 is an enlarged side elevational view of the FIG. 1 apparatus.

FIG. 3 is a sectional view on line 3—3 in FIG. 2.

FIG. 4 is a top plan view of a structural detail used in the FIG. 2 apparatus.

FIG. 5 is a view in the same direction as FIG. 4, but showing an alternative form that the structural detail can take.

DESCRIPTION OF THE PREFERRED EMBODIMENT

Figure 6:
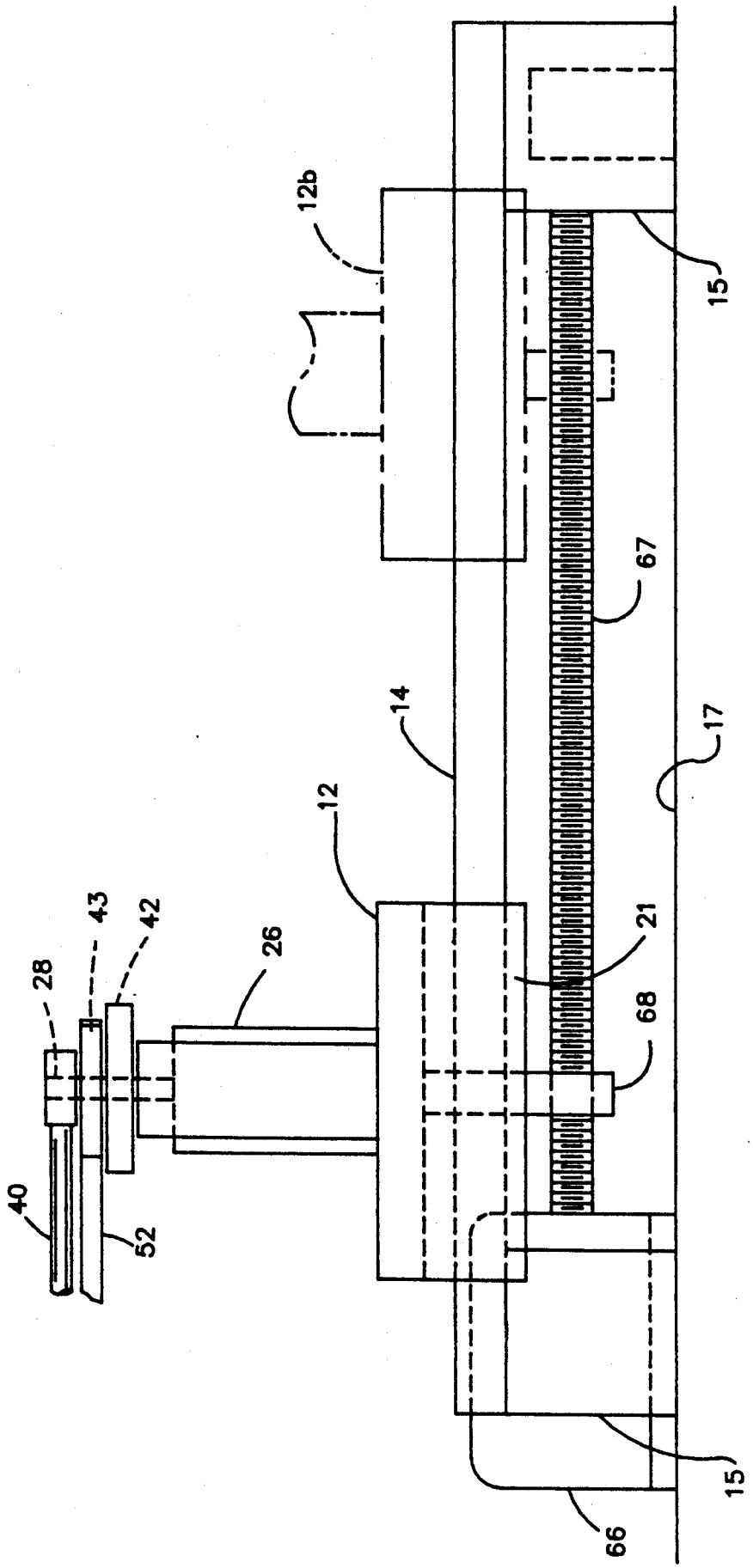
FIG. 6 is a fragmentary side elevational view of a second apparatus embodying the invention.

FIG. 1 is a top plan view of a mechanism for transferring a workpiece between two locations. In the drawing, the workpiece is an automotive door panel 10, although the transfer mechanism can be used to move other types of workpieces. Door panel 10 is shown in a starting location 10a and a final location 10b. The panel moves in essentially a linear fashion between location 10a and location 10b.

The transfer mechanism comprises a carriage 12 movable in a left-to-right direction along stationary tracks (guides) 14 between a full line position 12a and a dashed line position 12b. The mechanism further includes a pair of foldable arm structures 16 and 18 swingably attached to carriage 12 for movement between full line positions 16a, 18a and dashed line positions 16b, 18b. A work support platform 20 is attached to the outer (free) ends of arm structures 16 and 18. The platform moves between full line position 20a and dashed line position 20b. The mechanism is reversible, i.e. from the dashed line position back to the full line position.

Carriage 12 is shown in FIG. 3 to include a rectangular table having two depending channel sections 21 partially encompassing stationary guides 14. Anti-friction elements can be incorporated in the channel sections. Foot structures 15 support guides 14 in a spaced relation on floor 17. Carriage 12 is movable in the arrow 19 direction.

A vertical axis servo motor 26 is mounted atop carriage 12. The motor has a downwardly extending shaft section 27 and an upwardly extending shaft section 28. A toothed cogwheel 30 is affixed to shaft section 27. A second, relatively small cogwheel 31 is affixed to a link 32 that is swingably mounted on a circular post 34 upstanding from a flanged base structure 35. An endless toothed belt 36 is trained around cogwheels 30 and 31. When motor 26 is energized, cogwheel 30 drives belt 36 in the arrow 37 direction (FIG. 1). The interaction between cogwheel 31 and belt 36 causes link 32 to move around post 34 in the arrow 39 direction (FIG. 1). Such movement of link 32 moves carriage 12 rightwardly from the full line position 12a to the dashed line position 12b (with a 180° rotation of link 32). Belt 36 acts as a force transmission link between cogwheel 31 and carriage 12.

Servo motor shaft section 28 is affixed at its upper end to an elongated arm 40. Shaft section 28 also has affixed thereto a pinion gear 42 and cogwheel 43. Pinion gear 42 is meshed with a pinion gear 45 that is affixed to a vertical shaft 46. Shaft 46 is an idler shaft supported in a bearing unit 47. The meshed engagement of pinion 45 and 42 causes the associated shafts 46 and 28 to rotate at the same speed, but in opposite directions. Shaft section 28 powers foldable arm structure 16, whereas shaft 46 powers foldable arm structure 18.

Arm structure 16 includes arm 40 and a second arm 48 having the same effective length as arm 40. The two arms are interconnected by means of a pivot connection 49 that includes a vertical pin 50 affixed to arm 48, and a cogwheel 51 affixed to pin 50. An endless toothed belt 52 is trained around cogwheels 43 and 51. Therefore, when shaft 28 moves arm 40 in the arrow 53 direction (FIG. 1), belt 52 exerts a force on cogwheel 51 in the arrow 54 direction.

Cogwheel 43 has a diameter that is twice (or approximately twice) the diameter of cogwheel 51. Therefore arm 40 moves around its pivot axis (shaft 28) at twice the rate that arm 48 moves around its pivot connection 49 with arm 40. The free (left) end of arm 48 is affixed to a pinion gear 56 that is rotatably attached to the underface of a work platform 20. Vacuum cups 57 are suitably attached to platform 20 to engage work 10.

Foldable arm structure 18 is a mirror image of foldable arm structure 16. In the drawing similar reference numerals are applied to corresponding components of the two arm structures. Each arm 48 is rotatably attached to platform 20 via the associated gears 56, 56. Gears 56 are in turn linked together via two other in-mesh gears 58. This gear type linkage between arms 48, 48 and platform 20 causes arms 48 to have a mirror image angular relationship to a reference plane 59 taken through the various pivot connections. Thus, in the full line position, both arms 48 are normal to reference plane 59, whereas in the dashed line position 48a, both arms are at the same acute angle to plane 59 (but in opposite directions, not in parallel).

FIG. 5 illustrates an alternative linkage to gear linkage 56, 58 of FIG. 4. A link 60 has pivotal connections 61 to the undersurfaces of arms 48, such that the arms have a mirror image angular relationship to reference plane 59 in all angular positions of the arms.

Figure 7:
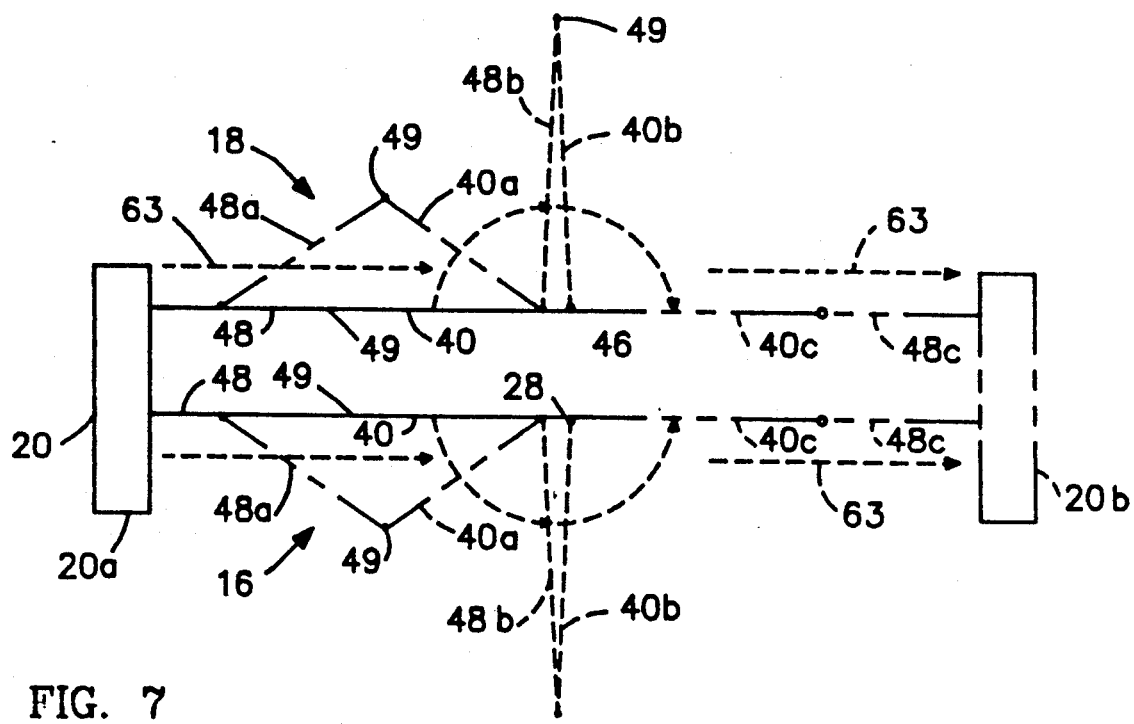
FIG. 7 is a schematic representation of the movements that take place during operation of the FIG. 1 apparatus.

FIG. 7 diagrammatically illustrates the motions of the various arms 40 and 48 resulting from energization of servo motor 26. FIG. 7 does not show carriage 12 or the effect of carriage movement on the positions of arms 40 and 48.

Referring to FIG. 7, each arm 40 moves from the full line position through dashed line positions 40a and 40b to dashed line position 40c. The associated arms 48 move from the full line positions through dashed line positions 48a and 48b to dashed line position 48c. Such arm motions cause platform 20 to move in linear fashion from full line position 20a to dashed line position 20b. Dashed lines 63 denote path lines for end edges of platform 20. Arms 40 and 48 are swingable in different planes, as can be visualized from FIG. 2, so that arm 48 can swing across arm 40 as depicted in FIG. 7.

The arm motions depicted in FIG. 7 are produced by a power mechanism that includes the in-mesh pinion gears 42 and 45, and the endless belts 52 trained around the associated cogwheels 43 and 51. Pinion gears 42 and 45 mesh together so that shafts 28 and 46 rotate at the same speed, but in opposite directions. Belts 52 interact with cogwheels 43 and 51 to cause arms 40 and 48 to rotate at different angular velocities (arm 40 has twice the angular velocity of arm 48 due to the different diameters of cogwheels 43 and 48). Each arm 40 is powered by a shaft 28 (or 46), whereas the associated arm 48 is powered by belt 52. The stabilizer link connections (58 or 60) between the free ends of arms 48 cause platform 20 to maintain a predetermined attitude during its travel between full line position 20a and dashed line position 20b. The motion system is reversible; i.e. reverse motion of servo motor 26 will cause platform 20 to be returned from dashed line position 20b to full line position 20a.

It was noted earlier that carriage 12 is movable between full line position 12a and dashed line position 12b. The carriage motion is additive to the folding-unfolding motions of arm structures 16 and 18 (i.e. arms 40 and 48). FIG. 1 shows the complete action.

FIGS. 2 and 3 show an arrangement wherein a single servo motor 26 is used to drive both carriage 12 and arm structures 16 and 18. However, it is not essential that a single motor be used for both drives. FIG. 6 illustrates an arrangement wherein servo motor 26 is used only to drive arm structures 16 and 18. A second motor 66 drives carriage 12. The drive system includes a threaded shaft 67 extending through a nut carried in an arm 68 that depends from carriage 12. Rotation of shaft 67 by motor 66 causes carriage 12 to be driven leftwardly or rightwardly along stationary guides 14, depending on the direction of motor 66 rotation.

The FIG. 6 system operates in essentially the same fashion as the FIG. 1 system except that in the FIG. 6 arrangement, carriage 12 can be selectively moved different distances along guides 14. In the FIG. 1 system the stroke of carriage 12 is predetermined to some extent by the length of the link 32. The FIG. 6 system is somewhat more flexible than the FIG. 1 system.

The system shown in the drawings is advantageous in that the motion of carriage 12 is augmented by the unfolding-folding motions of arm structures 16 and 18. Work platform 20 can be extended from one end of the carriage to reach and extract a workpiece from a first space. As the carriage retracts from the first space, arm structures 16 and 18 shift platform 20 to the other end of the carriage for depositing the workpiece into a second space.

The carriage occupies a relatively narrow floor space (compared to the total stroke distance of the work platform). The carriage can therefore be installed into relatively small restricted spaces between pre-existing work stations. At the same time, the folding-unfolding nature of arm structures 16 and 18 enables the work platform to extend into remote areas beyond opposite ends of the carriage and its guide means 14.

The folding-unfolding action of arm structures 16 and 18 is further advantageous in that a desired deceleration of platform 20 occurs as the platform nears the limits of its motions, i.e. positions 20a and 20b. For example, by reference to FIG. 7, during movement of arm 40 between position 40a and the full line position, the free end of arm 48 moves only a short distance compared to the distance arm 40 moves between position 40b and position 40a. The travel rate of platform 20 is considerably lower as the platform nears the limits of its motion, compared to the travel rate during the mid portions of the platform travel. This is advantageous in achieving a controlled deceleration of the platform, with improved control on the platform position and lessened shock loadings on the mechanism components.

In some cases, it may be desirable to reorient the workpiece as it is being transferred between the loading point and the unloading point. The mechanism fragmentarily shown in FIGS. 8 and 9 enables the work platform (and supported workpiece) to rotate around a vertical axis while the platform is moving between positions 20a and 20b (FIG. 7). The platform rotation is produced as an incidental effect of the swinging motions of arms 48 during the linear travel of the work platform.

Figure 8:
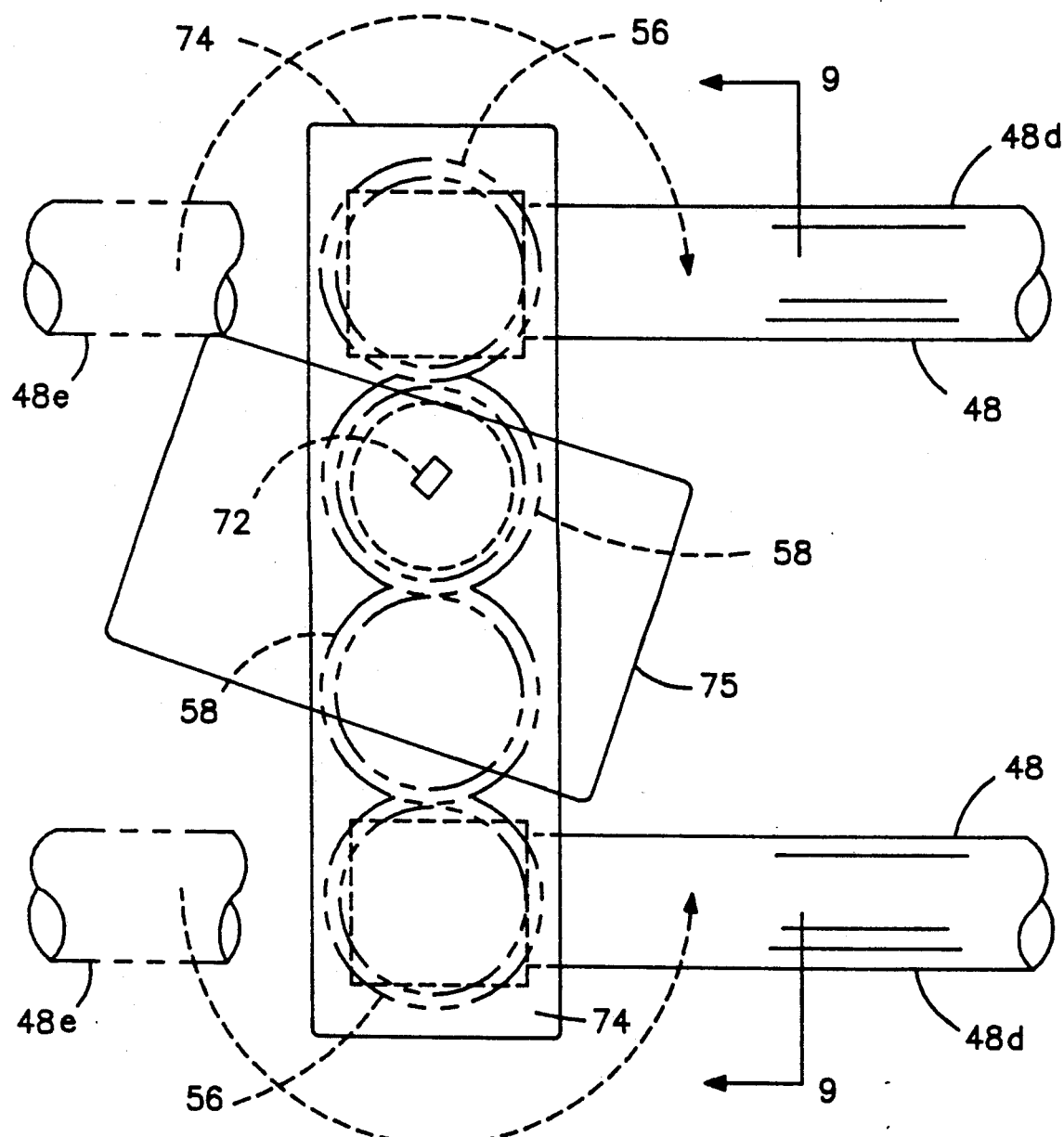
FIG. 8 is a view similar to FIG. 4, but illustrating an alternative construction.
Figure 9:
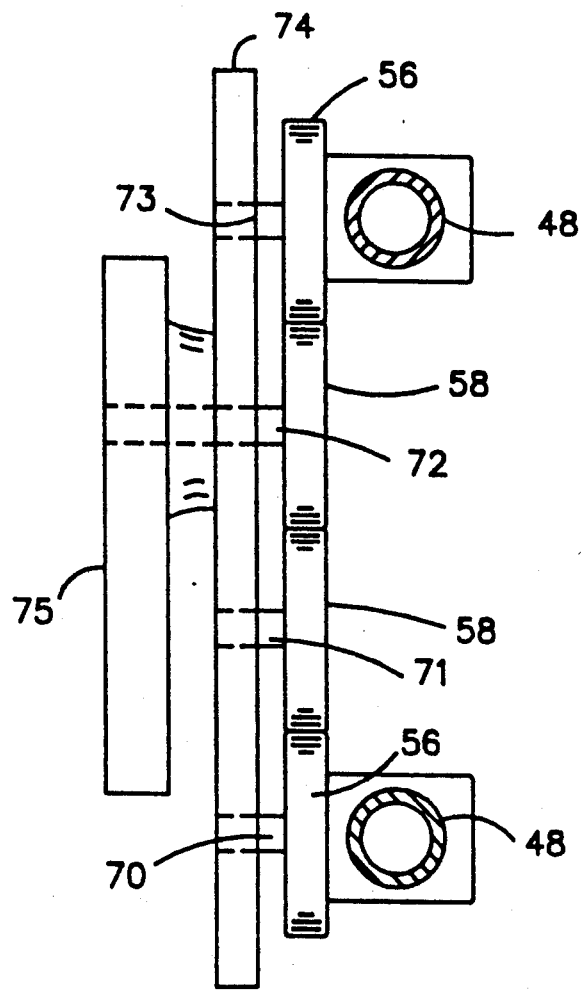
FIG. 9 is a sectional view on line 9—9 in FIG. 8.

The mechanism shown in FIGS. 8 and 9 comprises two arms 48 having pinion gears 56 affixed thereto. Intermediate idler gears 58 are in mesh with gears 56. Shafts 70, 71, 72 and 73 for gears 56 and 58 are rotatably mounted in bearings in a connector plate 74. Shaft 72 for one of gears 58 extends through plate 74 into a workpiece support platform 75. Platform 75 can thereby rotate with associated gear 58.

During a complete traverse of platform 75 (between positions 20a and 20b) arms 48 swing through arcs of 180° between full line position 48d and dashed line positions 48e. Thus, each associated gear 56 and 58 rotates one half revolution around its individual axis (assuming each gear has the same diameter). The gear rotation causes platform 75 to be rotated around the axis of associated shaft 72. In some cases, this rotation is helpful in reorienting the workpiece as it is being transferred between the load point and the unload point.

The magnitude of platform rotation can be varied by varying the relative diameter of gear 58 associated with platform 75. An increase in the gear 58 diameter reduces the platform rotation.

The drawings show specific forms that the invention can take. Other forms are possible.

What is claimed is:

1. A work transfer mechanism comprising:
   a first work station location (10a) and a second work station location (10b) spaced apart a predetermined distance;
   a work platform adapted for movement between the work station locations
   linear guide means (14) extending along an imaginary path line drawn through the work station locations, said linear guide means having a lesser length than said predetermined distance so that opposite ends of said guide means are spaced from the work station locations;
   a carriage (12) movably supported on said linear guide means for movement between a first position at one end of the guide means and a second position at the other end of the guide means;
   a pair of similarly dimensioned foldable arm structures extending between the carriage and the work platform;
   each foldable arm structure comprising a first elongated arm (40) having at one end thereof a first pivot connection to the carriage whereby said first arm is swingable in a first horizontal plane spaced above the carriage, and a second elongated arm (48) having at one end thereof a second pivot connection to the other end of the first arm whereby said second arm is swingable in a second horizontal plane spaced above the carriage; said second arm having its other end located underneath the work platform;
   means (56 or 58) connecting said other ends of said second arms (48) to each other and to the work platform, said connection means including a series of meshed gears arranged so that said second arms can swing in unison independently of the platform while transporting the platform along a linear path defined by said linear guide means (14);
   each first arm (40) having a stroke of approximately 180 degrees measured around the associated first pivot connection, each second arm (48) having a stroke of approximately 180 degrees measured around the associated second pivot connection, whereby the arms in each foldable arm structure are essentially in longitudinal alignment when the work platform reaches either work station location;
   and power means for moving said carriage along the linear guide means and for swinging said arms around their associated pivot connections;
   said foldable arm structures serving as linear extensions of the carriage when the work platform is at either work station location; said work platform being transportable between the work station locations by a combination of carriage motion and arm structure motion.

2. The work transfer mechanism of claim 1 and further comprising a first cogwheel (43) carried by each said first arm for rotation around the axis of the associated first pivot connection, a second cogwheel (51) carried by each said second arm for rotation around the axis of the associated second pivot connection, and endless toothed belts (52) trained around said first and second cogwheels.

3. The work transfer mechanism of claim 1, wherein said power means comprises a motor (26), a first cogwheel (30) powered by said motor for rotation around the cogwheel axis, a link (32) having one end thereof pivotably anchored at a fixed point (34) along the path of the carriage, a second cogwheel (31) affixed to said link remote from the link anchorage point, and a toothed belt (36) trained around said cogwheels; said first cogwheel having a larger diameter than said second cogwheel.

4. The work transfer mechanism of claim 1, wherein said connecting means between said second arm (48) and said work platform comprises a connector element (74), first gears (56) carried by said second arms (48), and second gears (58) in meshed connection with each other and with said first gears; each gear being rotatably mounted on said connector element; only one of said second gears being affixed to the work platform, whereby the work platform is caused to rotate around the rotational axis of said one gear as the work platform moves between the two work station locations.

5. A work transfer mechanism comprising:
   two spaced-apart work station locations (10a and 10b);
   a support structure;
   a work platform, movable between the work station locations;
   first and second foldable arm structures extending from said support structure to said platform, each foldable arm structure comprising a first arm (40) having a first pivot connection to said support structure, and a second arm (48) having a second pivot connection to the associated first arm and a third pivot connection to said platform;
   power means, including a power shaft connected to the first pivot connection of the first foldable arm structure for rotation therewith, and an idler shaft connected to the first pivot connection of the second foldable arm structure for rotation therewith, a first pinion gear mounted on the power shaft for rotation therewith, a second pinion gear mounted on the idler shaft for rotation therewith, the first pinion gear being drivingly meshed with the second pinion gear;
   a first cogwheel carried by each of the first arms for rotation around each of said first pivot connection axes, a second cogwheel carried by each of second arms for rotation around the associated second pivot connection axis, and endless tooth belts trained around the associated first and second cogwheels, whereby the power means is operative to simultaneously apply and operating torque to each pivot connection, and each foldable arm structure undergoes a folding action and an unfolding action when the power means is energized, each first arm (40) having a stroke of approximately 180 degrees measured around the associated first pivot connection, each second arm (48) having a stroke of approximately 180 degrees measured around the associated second pivot connection, whereby the arms in each foldable arm structure are essentially in longitudinal alignment when the work platform reaches either work station location.

* * * * *